Figure 1:
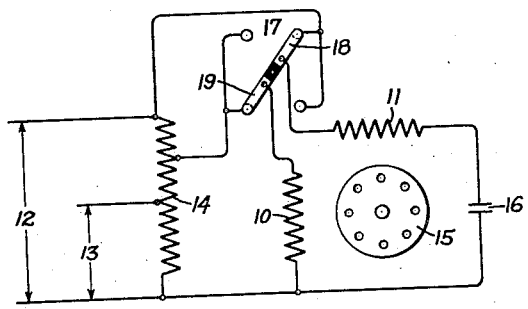

March 27, 1934.  S. R. BERGMAN  1,952,155

ADJUSTABLE SPEED CAPACITOR MOTOR

Original Filed Dec. 9, 1932

Inventor:
Sven R. Bergman,
by Chas E. Mullen
His Attorney.

Patented Mar. 27, 1934

1,952,155

UNITED STATES PATENT OFFICE 1,952,155

ADJUSTABLE SPEED CAPACITOR MOTOR

Sven E. Bergman, Nahant, Mass., assignor to General Electric Company, a corporation of New York Original application December 9, 1932, Serial No. 646,466. Divided and this application May 3, 1933, Serial No. 669,175

1 Claim. (Cl. 172—278)

My invention relates to adjustable speed capacitor motors of the type in which capacitance is employed not only to obtain split phase starting, but also for power factor correction during running, and the primary object is to provide a simple arrangement for maintaining a desirable voltage upon the capacitance as the speed of the motor is varied. This application is a division of application Serial No. 646,466, filed December 9, 1932, assigned to the same assignee as the present application.

It is known that in the split phase type of motor having main and starting windings with capacitance in the starting winding circuit, the voltage across the starting winding and across the capacitance varies directly with speed. This is because of the variable transformer action between the main and starting windings with various speeds and the difference in the vector directions of the voltages across the starting winding and the capacitance.

It is also known that the speed of this type of motor may be varied by varying the voltage impressed upon the main winding. See, for example, United States Patent No. 1,726,231, Kennedy.

When the speed of such a motor is increased, it is desirable that the voltage across the capacitance be decreased, and vice-versa, in order to compensate for the variable voltage that would otherwise exist across the capacitance due to transformer action; particularly is this true when speed variation is obtained by voltage variation across the main winding which acts as the primary of the transformer supplying the voltage induced in the starting winding.

According to my invention, I provide speed regulating means which automatically changes the line component voltage across the starting winding circuit in inverse ratio to the speed of the motor. Thus, while an increase in speed increases the motor transformer voltage component in the starting winding circuit, the line voltage component thereof is reduced. This arrangement not only prevents excessive voltages on the capacitance during high speed running, but also tends to increase the capacitance effect and motor torque for starting and low speed operation, making it unnecessary, except in special cases, to provide other means for changing the amount of capacitance used between starting and running conditions.

The features of my invention which are believed to be novel and patentable will be pointed out in the claim appended hereto. For a better understanding of my invention, reference is made in the following description to the accompanying drawing, showing in Fig. 1 a two-speed condenser motor provided with an auto-transformer and speed changing switch whereby the voltages applied across the main and starting winding circuits are interchanged in value in the different speed adjustments. Fig. 2 represents voltage vector relations that will be referred to in the explanation of Fig. 1.

Figure 2:
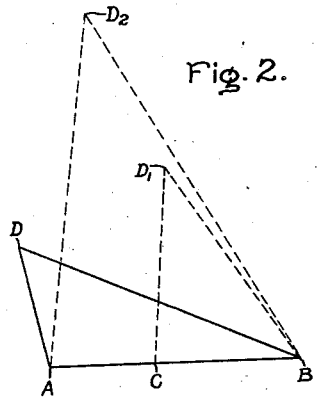

Referring to Fig. 1, a single phase condenser motor having main and starting windings 10 and 11 is supplied from a line 12 or from a lower voltage line 13 through an auto-transformer 14. The motor secondary 15 is shown as the squirrel cage type and as the rotor. 16 represents a condenser in the starting winding circuit, and 17 represents the speed control switch.

It will be noted that the speed control device has two conducting parts 18 and 19 mounted on the same movable arm, which is pivoted at its center. Part 18 is connected to one end of the starting winding 11 and cooperates with the two upper stationary contacts. Part 19 is connected to one end of the main winding 10 and cooperates with the two lower stationary contacts. The upper and lower stationary contacts to the right are connected to the one end of auto-transformer 14, and the upper and lower stationary contacts to the left are connected to an intermediate tap of the auto-transformer. The other ends of the motor winding circuits and transformer are connected to line on the other side.

The connection with the speed regulating device in the position shown is for starting and low speed operation. It is noted that the line component of voltage applied to the main winding 10 is appreciably less than that applied to the circuit containing the stationary winding 11 and condenser 16. Under these conditions, with the motor operating at slow speed, we may represent the line component of voltage applied across the starting winding circuit by the vector A B in Fig. 2, and that applied across the main winding by the vector C B. The voltage across the starting winding may then be represented by vector A D, and that across the condenser by D B. When the switch 17 is thrown to the high speed position, the line component of voltage across the starting winding circuit is reduced to C B, and that across the main winding is increased to A B.

The voltage across the starting winding tends to increase due to an increase in transformer action due to the increase in speed and the increased voltage across the main winding acting as the primary of the motor transformer. However, due to the reduced line component of voltage across the starting winding circuit and the way the voltage vectors combine to close the voltage triangle of the starting winding circuit, the voltage across the starting winding is not greatly increased, and may be represented by C D', while the voltage across the condenser remains about the same and may be represented by D' B. If, however, the line voltage component across the starting winding circuit had been left unchanged as A B for high speed operation, we would obtain a voltage triangle for the starting winding circuit of the order of A D² B. This illustrates the advantage of reducing the voltage across the starting winding circuit when the speed is increased in this way.

The invention provides good split phase starting conditions on the low speed point of the controller, since it will be evident that increasing the voltage across a given condenser at start has the same effect as increasing the amount of capacitance at constant voltage. Where the starting torque requirements are not excessive, the speed control switch may serve as the starting switch, using the low speed position. For heavy starting duty, it may be advisable to apply a higher voltage to the main winding for starting, and facilities for accomplishing this may be added without departing from the invention.

Such other modifications of the invention as will occur to those skilled in the art for carrying out the invention are intended to be included within the scope of the appended claim.

What I claim as new and desire to secure by Letters Patent of the United States, is:

A two-speed motor having main and starting winding circuits, a single phase source of supply, a transformer connected across said source independently of the motor, connections between one end of both of said winding circuits and one side of said source, phase modifying means included in the starting winding circuit, and switching means between said transformer and motor for applying two different voltages to each of the motor winding circuits in two different positions of said switching means such that the voltage applied to the main winding in one position of said switch is the same as the voltage applied to the starting winding circuit for the other position of said switch, and vice-versa.

SVEN R. BERGMAN.